(12) United States Patent
Kim et al.

(10) Patent No.: US 12,065,014 B2
(45) Date of Patent: Aug. 20, 2024

(54) THERMAL MANAGEMENT SYSTEM FOR VEHICLE

(71) Applicants: Hyundai Motor Company, Seoul (KR); Kia Corporation, Seoul (KR)

(72) Inventors: Jae Yeon Kim, Gyeonggi-do (KR); Su Whan Kim, Gyeonggi-do (KR); Yeonho Kim, Seoul (KR); Jeawan Kim, Gyeonggi-do (KR); Wan Je Cho, Gyeonggi-do (KR); Seong-Bin Jeong, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 50 days.

(21) Appl. No.: 17/689,478

(22) Filed: Mar. 8, 2022

(65) Prior Publication Data

US 2022/0314734 A1    Oct. 6, 2022

(30) Foreign Application Priority Data

Mar. 30, 2021  (KR) ................. 10-2021-0040789

(51) Int. Cl.
  *A47F 3/04*   (2006.01)
  *B60H 1/00*   (2006.01)
  *B60H 1/14*   (2006.01)
  *B60K 11/04*   (2006.01)

(52) U.S. Cl.
  CPC ..... *B60H 1/00278* (2013.01); *B60H 1/00885* (2013.01); *B60H 1/143* (2013.01); *B60K 11/04* (2013.01); *B60H 2001/00307* (2013.01)

(58) Field of Classification Search
  CPC  B60H 1/00278; B60H 1/00885; B60H 1/143; B60H 2001/00307; B60K 11/04
  USPC .......................................................... 62/247
  See application file for complete search history.

(56) References Cited

U.S. PATENT DOCUMENTS

2020/0171913 A1\*  6/2020  Kim ................. H01M 10/625

\* cited by examiner

*Primary Examiner* — Davis D Hwu
(74) *Attorney, Agent, or Firm* — Fox Rothschild LLP

(57) ABSTRACT

A thermal management system for a vehicle includes a cooling device including a radiator, at least one electrical component, and first and second water pumps that are connected to a coolant line, the cooling device configured to circulate coolant through the coolant line so that the coolant is supplied to the at least one electrical component; and first and second oil coolers connected to cool at least one driving motor and supplied with the coolant from the cooling device, where the second oil cooler is provided on the coolant line, and the first oil cooler is disposed in parallel with the second oil cooler provided on the coolant line through a parallel line provided on the coolant line.

16 Claims, 4 Drawing Sheets

THERMAL MANAGEMENT SYSTEM FOR VEHICLE

CROSS-REFERENCE TO RELATED APPLICATION

This application claims under 35 U.S.C. § 119 the benefit of Korean Patent Application No. 10-2021-0040789 filed in the Korean Intellectual Property Office on Mar. 30, 2021, the entire contents of which are incorporated herein by reference.

BACKGROUND

(a) Technical Field

The present disclosure relates to a thermal management system for a vehicle, more particularly, to the thermal management system capable of improving cooling performance of electrical components and driving motors by controlling a flow rate of coolant in the vehicle (e.g., an electric vehicle).

(b) Description of the Related Art

Recently, with a greater focus on environmental issues and energy conservation issues, electric vehicles have been in the spotlight as a likely solution to provide a clean form of transportation while addressing current environmental concerns and lowering emissions in the future. Since an electric vehicle uses a battery module in which a plurality of secondary cells capable of charging or discharging electricity are formed in one pack as a main power source, there is no exhaust gas and very little noise.

Such an electric vehicle is driven by a driving motor that operates through electric power supplied from the battery module. In addition, an electric vehicle is provided with electrical components for controlling and managing the driving motor and charging the battery module, together with a plurality of electronic devices for convenience devices.

Meanwhile, since the battery and the electrical components, together with the motor used as the main power source of electric vehicle, generate very large amounts of heat, efficient cooling is required, and therefore, efficient temperature management of the motor, electronic components, and battery module may be a very important issue.

Conventionally, separate cooling systems are applied to control the temperatures of the electric component, the motor, and the battery module, but the capacity of the cooling systems should be increased according to the sizes of the motor, the electric component, and the battery module, which causes a problem in that a space is limited. In addition, when the capacity of each cooling system is increased, there is also a problem in that the power required to operate each cooling system is increased.

Accordingly, in the electric vehicle, in order to maximize energy efficiency while securing durability of the motor, the electric component, and the battery module, a technology development for efficient temperature control of the electric component and the battery module while simplifying the cooling system is required.

The above information disclosed in this Background section is only for enhancement of understanding of the background of the disclosure and therefore it may contain information that does not form the prior art that is already known in this country to a person of ordinary skill in the art.

SUMMARY

The present disclosure provides a thermal management system for a vehicle having advantages of improving cooling efficiency of electrical components and driving motors by controlling a flow rate of coolant in an electric vehicle.

An exemplary embodiment of the present disclosure provides a thermal management system for a vehicle including: a cooling device including a radiator, at least one electrical component, and first and second water pumps that are connected to a coolant line, the cooling device configured to circulate coolant through the coolant line so that the coolant is supplied to the at least one electrical component; and first and second oil coolers connected to cool at least one driving motor and supplied with the coolant from the cooling device, where the first oil cooler is provided on the coolant line, and the second oil cooler is disposed in parallel with the first oil cooler provided on the coolant line through a parallel line provided on the coolant line, the first water pump is provided on the coolant line connecting the radiator and the parallel line, and the second water pump is provided on the coolant line connecting the first water pump and the second oil cooler at a position spaced apart from the parallel line.

The at least one driving motor may be configured as first and second driving motors, respectively, to correspond to front and rear wheels, the first oil cooler may be provided on the parallel line to correspond to the first driving motor, and the second oil cooler may be provided on the coolant line to correspond to the second driving motor.

A first end of the parallel line may be connected to the coolant line at a position spaced apart from a rear end of the first water pump, and a second end of the parallel line may be connected to the coolant line at a front end of the radiator based on a flow direction of the coolant.

A pumping head of the first water pump may be larger than the pumping head of the second water pump so that a flow rate of the coolant supplied to the parallel line and the coolant line are similar.

When the first water pump and the second water pump have the same pumping head, the first water pump and the second water pump may operate at different revolutions per minute (RPM) so that flow rates of the coolant supplied to the first and second oil coolers through the parallel line and the coolant line are similar.

The first water pump may operate at a higher revolution per minute (RPM) than that of the second water pump.

The at least one electrical component may include first and second electrical components of an inverter and an on board charger respectively disposed on the coolant line and the parallel line to correspond to the first and second oil coolers.

The thermal management system for a vehicle may further include an air conditioning device including a heat exchanger connected to the coolant line to heat-exchange the coolant introduced therein with a refrigerant, and an expansion valve, an evaporator, and a compressor connected to the heat exchanger through a refrigerant line; and a branch line having a first end connected to the coolant line between the radiator and the parallel line and a second end connected to the coolant line between the heat exchanger and the radiator.

The second end of the branch line may be connected to the coolant line through a branch valve provided on the coolant line.

The thermal management system for a vehicle may further include: a sub cooling device including a sub radiator and a sub water pump that are connected to a sub coolant line, the sub radiator configured to circulate the coolant through the sub coolant line, wherein the heat exchanger is connected to the sub coolant line so that the coolant is supplied from the sub cooling device.

The first driving motor may be connected to the first oil cooler through a first oil line, and a first oil pump is provided on the first oil line, the second driving motor may be connected to the second oil cooler through a second oil line, and a second oil pump may be provided on the second oil line.

A reservoir tank may be provided on the coolant line between the radiator and the at least one water pump.

Another embodiment of the present disclosure provides a thermal management system for a vehicle including: a cooling device including a radiator, at least one electrical component, and at least one water pump that are connected to a coolant line, the cooling device configured to circulate coolant through the coolant line so that the coolant is supplied to the at least one electrical component; first and second oil coolers connected to cool at least one driving motor and supplied with the coolant from the cooling device, where the second oil cooler is provided on the coolant line, and the first oil cooler is disposed in parallel with the second oil cooler provided on the coolant line through a parallel line provided on the coolant line, the at least one water pump are provided on the coolant line connecting the radiator and the parallel line at a front end of the parallel line, a first end of the parallel line is connected to the coolant line through a valve at a position spaced apart from a rear end of the water pump, and a second end of the parallel line is connected to the coolant line at a front end of the radiator based on a flow direction of the coolant.

The valve may be a 3-way valve that distributes a flow rate.

The at least one driving motor may be configured as first and second driving motors, respectively, to correspond to front and rear wheels, and the at least one oil cooler may include the first oil cooler provided on the parallel line to correspond to the first driving motor; and the second oil cooler provided on the coolant line to correspond to the second driving motor.

The first driving motor may be connected to the first oil cooler through a first oil line, and a first oil pump is provided on the first oil line, the second driving motor may be connected to the second oil cooler through a second oil line, and a second oil pump may be provided on the second oil line.

The at least one electrical component may include first and second electrical components of an inverter and an on board charger respectively disposed on the coolant line and the parallel line to correspond to the first and second oil coolers.

The thermal management system for a vehicle may further include an air conditioning device including a heat exchanger connected to the coolant line to heat-exchange the coolant introduced therein with a refrigerant, and an expansion valve, an evaporator, and a compressor connected to the heat exchanger through a refrigerant line; and a branch line having a first end connected to the coolant line between the radiator and the parallel line and a second end connected to the coolant line through a branch valve provided on the coolant line between the heat exchanger and the radiator.

The thermal management system for a vehicle may further include: a sub cooling device including a sub radiator and a sub water pump that are connected to a sub coolant line, the sub radiator configured to circulate the coolant through the sub coolant line, wherein the heat exchanger is connected to the sub coolant line so that the coolant is supplied from the sub cooling device.

A reservoir tank may be provided on the coolant line between the radiator and the at least one water pump.

According to an embodiment of the present disclosure, the thermal management system for a vehicle may secure the cooling performance of the electrical components and the driving motors that generate a large amount of heating in the electric vehicle, simplify the overall system, and improve durability of the electrical components and the driving motors.

Further, according to the present disclosure, the cooling efficiency of the electrical components and the driving motors may be improved by disposing the oil coolers connected to the driving motors disposed to correspond to the front wheels and the rear wheels in parallel, and efficiently controlling the flow rate of the coolant supplied to each oil cooler through control of each water pump or control of a valve.

Further, according to the present disclosure, the overall mileage of the electric vehicle may be increased by minimizing the power consumption through efficient temperature control so that the optimal performance of the electrical components and the driving motors is exhibited.

Further, the entire thermal management system for a vehicle is simplified, thereby making it possible to reduce a cost required for manufacturing the thermal management system for a vehicle and a weight of the thermal management system for a vehicle and improve space utilization.

DETAILED DESCRIPTION OF THE EMBODIMENTS

Figure 1:
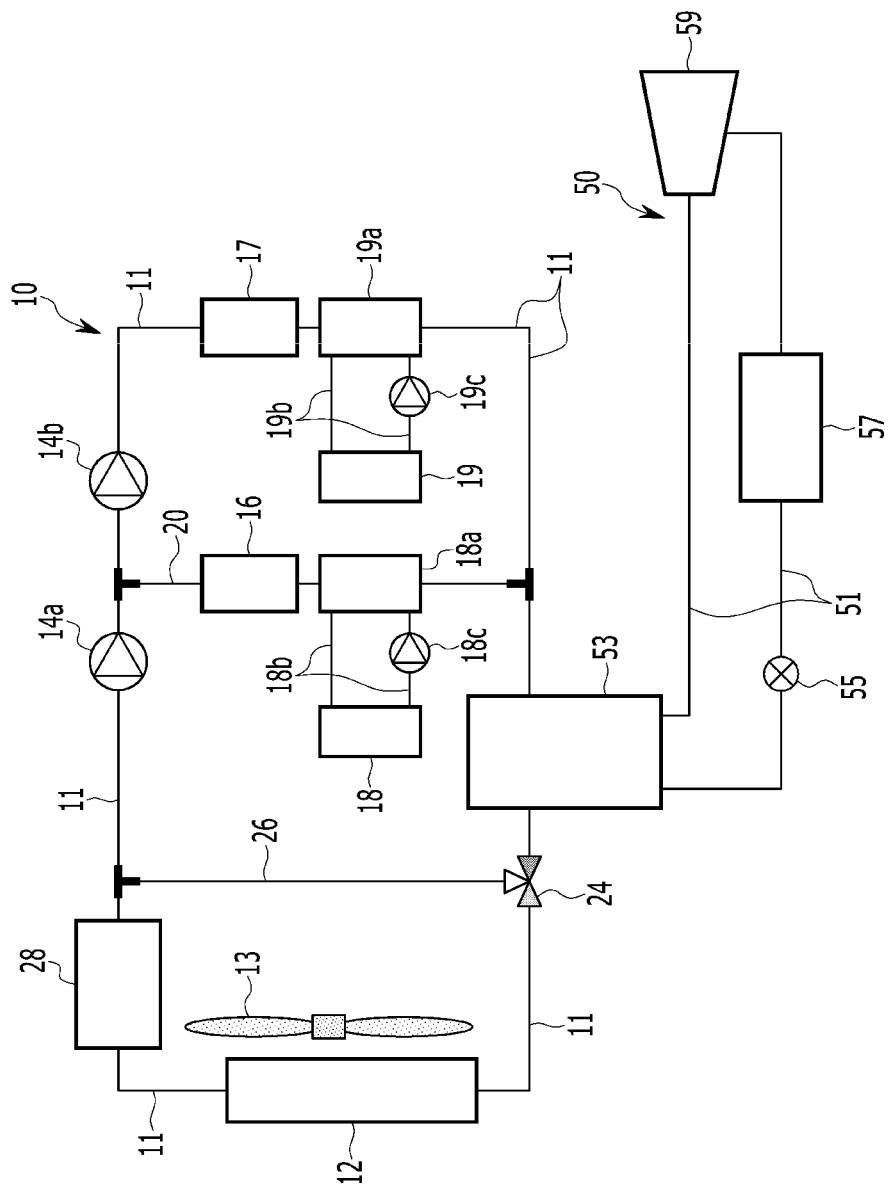
FIG. 1 is a block diagram of a thermal management system for a vehicle according to a first exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example, both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

An exemplary embodiment of the present disclosure will hereinafter be described in detail with reference to the accompanying drawings.

Since exemplary embodiments stated in the present specification and configurations shown in the accompanying drawings are only exemplary embodiments of the present disclosure and do not represent the spirit of the present disclosure. Therefore, it is to be understood that various equivalents and modifications that may replace exemplary embodiments stated in the present specification and configurations shown in the accompanying drawings in a point in time at which the present disclosure is filed.

A description for contents that are not associated with the present disclosure will be omitted in order to clearly describe the present disclosure, and like reference numerals designate like elements throughout the specification.

Since sizes and thicknesses of the respective components were arbitrarily shown in the accompanying drawings for convenience of explanation, the present disclosure is not limited to contents shown in the accompanying drawings. In addition, thicknesses were exaggerated in order to obviously represent several portions and regions.

FIG. 1 is a block diagram of a thermal management system for a vehicle according to a first exemplary embodiment of the present disclosure.

The thermal management system for a vehicle according to the first exemplary embodiment of the present disclosure may improve cooling performance of electrical components and driving motors by controlling a flow rate of coolant.

Such a thermal management system may be applied to an electric vehicle.

Referring to FIG. 1, the thermal management system may include a cooling device 10 and at least one oil cooler.

First, the cooling device 10 includes a radiator 12, at least one electrical component, at least one water pump, and a reservoir tank 28, which are connected to a coolant line 11.

The radiator 12 is disposed at a front of the vehicle, and has a cooling fan 13 disposed behind the radiator 12 to cool the coolant through an operation of the cooling fan 13 and heat-exchange with external air.

In the present exemplary embodiment, the electric component includes an inverter and an on board charger (OBC). Meanwhile, the electric component may further include an electric power control unit (EPCU) or an autonomous driving controller.

Such an electric component may be cooled by coolant supplied from the cooling device 10.

Accordingly, when waste heat of the electrical component is recovered in a heating mode of the vehicle, heat generated from the power control device, the inverter, the charger, or the autonomous driving controller may be recovered.

In addition, the reservoir tank 28 is provided on the coolant line 11 between the radiator 12 and the at least one water pump. The coolant cooled by the radiator 12 may be stored in the reservoir tank 28.

In the first exemplary embodiment of the present disclosure, the at least one oil cooler is connected to at least one driving motor to cool the at least one driving motor, and may be selectively cooled by the coolant supplied from the cooling device 10.

In the present exemplary embodiment, among the at least one oil cooler, a second oil cooler is provided on the coolant line.

In addition, the first oil cooler may be disposed in parallel with the second oil cooler provided on the coolant line 11 through a parallel line 20 provided on the coolant line 11.

Here, the at least one driving motor may be configured as first and second driving motors 18 and 19, respectively, to correspond to front and rear wheels.

In addition, the at least one oil cooler includes a first oil cooler 18a provided on the parallel line 20 to correspond to the first driving motor 18, and a second oil cooler 19a provided on the coolant line 11 to correspond to the second driving motor 19.

That is, the first driving motor 18 may be connected to the first oil cooler 18a through a first oil line 18b, and a first oil pump 18c may be provided on the first oil line 18b.

In addition, the second driving motor 19 may be connected to the second oil cooler 19a through a second oil line 19b, and a second oil pump 19c may be provided on the second oil line 19b.

That is, the first and second oil coolers 18a and 19a may use the coolant supplied from the radiator 12 to cool the oil supplied to the first and second driving motors 18 and 19, respectively.

When cooling of the first and second driving motors 18 and 19 is required, the first and second oil pumps 18c and 19c may be selectively operated to supply cooled oil to the first and second driving motors 18 and 19.

In addition, the first and second oil pumps 18c and 19c may be operated even when the waste heat source generated by the first and second driving motors 18 and 19 is recovered in the heating mode of the vehicle.

That is, the temperature of the oil cooled by the first and second oil pumps 18c and 19c rises while the oil cooled by the first and second oil pumps 18c and 19c cools the first and second driving motors 18 and 19 through the first and second oil lines 18b and 19b.

The oil of which temperature rises may raise the temperature of the coolant while being cooled through heat-exchange with the coolant in the first and second oil coolers 18a and 19a.

The waste heat generated from the first and second driving motors 18 and 19 may be recovered through the above-described operation.

Meanwhile, the at least one electrical component includes first and second electrical components 16 and 17 respectively disposed on the coolant line 11 and the parallel line 20 to correspond to the first and second oil coolers 18a and 19a.

Here, the first electric component 16 may be provided on the parallel line 20, and the second electric component 17 may be provided on the coolant line 11.

In addition, the at least one water pump may include first and second water pumps 14a and 14b.

First, the first water pump 14a is provided on the coolant line 11 connecting the radiator 12 and the parallel line 20.

In addition, the second water pump 14b is provided on the coolant line 11 connecting the first water pump 14a and the second oil cooler 19a at a position spaced apart from the parallel line 20 based on a flow direction of the coolant.

Here, a first end of the parallel line 20 is connected to the coolant line 11 at a position spaced apart from a rear end of the first water pump 14a.

In addition, a second end of the parallel line 20 may be connected to the coolant line 11 at a front end of the radiator 12 based on the flow direction of the coolant.

Meanwhile, in the present exemplary embodiment, a pumping head of the first water pump 14a may have a larger than the pumping head of the second water pump 14b.

The pumping head refers to a height at which the pump may pump liquid when pumping the liquid.

That is, when the first water pump 14a has a larger pumping head than that of the second water pump 14b, a flow rate of the coolant supplied to the first oil cooler 18a through the parallel line 20 and a flow rate of the coolant supplied to the second oil cooler 19a through the coolant line 11 may be similar.

Therefore, the thermal management system may minimize water flow resistance generated in the parallel line 20 and the coolant line 11, respectively, and may efficiently distribute the flow rate of the coolant flowing into the coolant line 11 and the parallel line 20.

In addition, the thermal management system may secure the maximum flow rate of the coolant that passes through the first and second electrical components 16 and 17 and the first and second oil coolers 18a and 19a along the coolant line 11 and the parallel line 20, and is supplied to the radiator 12.

Accordingly, the cooling performance of the first and second electrical components 16 and 17 and the first and second oil coolers 18a and 19a may be improved.

Conversely, when the first water pump 14a has a smaller pumping head than that of the second water pump 14b, a flow rate of the coolant supplied to the first oil cooler 18a through the parallel line 20 is smaller than a flow rate of the coolant supplied to the second oil cooler 19a through the coolant line 11.

Then, the cooling performance of the first oil cooler 18a may be reduced, and the cooling performance of the first driving motor 18 may be reduced together. Accordingly, damage or failure of the first driving motor 18 may occur, and durability of the first driving motor 18 may be reduced.

Meanwhile, in the present exemplary embodiment, when the first water pump 14a and the second water pump 14b are the pumps having the same pumping head, the first water pump 14a and the second water pump 14b may operate at different revolutions per minute (RPM) so that the flow rates of the coolant supplied to the first and second oil coolers 18a and 19a through the parallel line 20 and the coolant line 11 are different from each other.

Here, the first water pump 14a may operate at a higher revolution per minute (RPM) than that of the second water pump 14b.

Accordingly, the flow rate of the coolant supplied to the first oil cooler 18a through the parallel line 20 and the flow rate of the coolant supplied to the second oil cooler 19a through the coolant line 11 may be similar.

That is, by controlling the RPM of the first and second water pumps 14a and 14b, the thermal management system may minimize water flow resistance generated in the parallel line 20 and the coolant line 11, respectively, and may efficiently distribute the flow rate of the coolant flowing into the coolant line 11 and the parallel line 20.

In addition, the thermal management system may secure the maximum flow rate of the coolant that passes through the first and second electrical components 16 and 17 and the first and second oil coolers 18a and 19a along the coolant line 11 and the parallel line 20, and is supplied to the radiator 12.

Accordingly, the cooling performance of the first and second electrical components 16 and 17 and the first and second oil coolers 18a and 19a may be improved.

Conversely, when the first and second water pumps 14a and 14b having the same pumping head operate at the same RPM, or the second water pump 14b operates at a higher RPM than that of the first water pump 14a, the flow rate of the coolant supplied to the first oil cooler 18a through the parallel line 20 is smaller than the flow rate of the coolant supplied to the second oil cooler 19a through the coolant line 11.

Then, the cooling performance of the first oil cooler 18a may be reduced, and the cooling performance of the first driving motor 18 may be reduced together. Accordingly, damage or failure of the first driving motor 18 may occur, and durability of the first driving motor 18 may be reduced.

On the other hand, in the first exemplary embodiment of the present disclosure, the thermal management system may further include an air conditioning device 50 and a branch line 26.

First, the air conditioning device 50 may include a heat exchanger 53 connected to the coolant line 11 to heat-exchange the coolant introduced therein with a refrigerant, and an expansion valve 55, an evaporator 57, and a compressor 59 connected to the heat exchanger 53 through a refrigerant line 51.

Here, the heat exchanger 53 is connected to the refrigerant line 51 to allow the refrigerant to pass therethrough. The heat exchanger 53 may be provided on the coolant line 11 between the second oil cooler 19a and the radiator 12 so that the coolant circulating in the coolant line 11 passes.

The heat exchanger 53 may condense the refrigerant through heat exchange with the coolant circulating in the coolant line 11. That is, the heat exchanger 53 may be a water-cooled heat exchanger into which the coolant flows.

The expansion valve 55 is provided on the refrigerant line 51 between the heat exchanger 53 and the evaporator 57. The expansion valve 55 may be supplied with the refrigerant that has passed through the heat exchanger 53 and expand the refrigerant.

The evaporator 57 evaporates the refrigerant that is expanded while passing through the expansion valve 55. In addition, the compressor 59 is connected between the evaporator 57 and the heat exchanger 53 through the refrigerant line 51.

The compressor 59 may compress a gaseous refrigerant and supply the compressed refrigerant to the heat exchanger 53.

In addition, a first end of the branch line 26 is connected to the coolant line 11 between the radiator 12 and the parallel line 20.

A second end of the branch line 26 may be connected to the coolant line 11 between the heat exchanger 53 and the radiator 12.

Here, the second end of the branch line 26 may be connected to the coolant line 11 through a branch valve 24 provided on the coolant line 11.

The branch valve 24 may control opening and closing of the branch line 26.

That is, when the waste heat of the first and second electrical components 16 and 17 and the first and second oil coolers 18a and 19a is recovered, the branch line 26 may be selectively opened and closed through the operation of the branch valve 24 so that the coolant is supplied back to the first and second electrical components 16 and 17 and the first and second oil coolers 18a and 19a without passing through the radiator 12.

On the other hand, a thermal management system for a vehicle according to a second exemplary embodiment of the present disclosure will be described with reference to FIG. 2.

Figure 2:
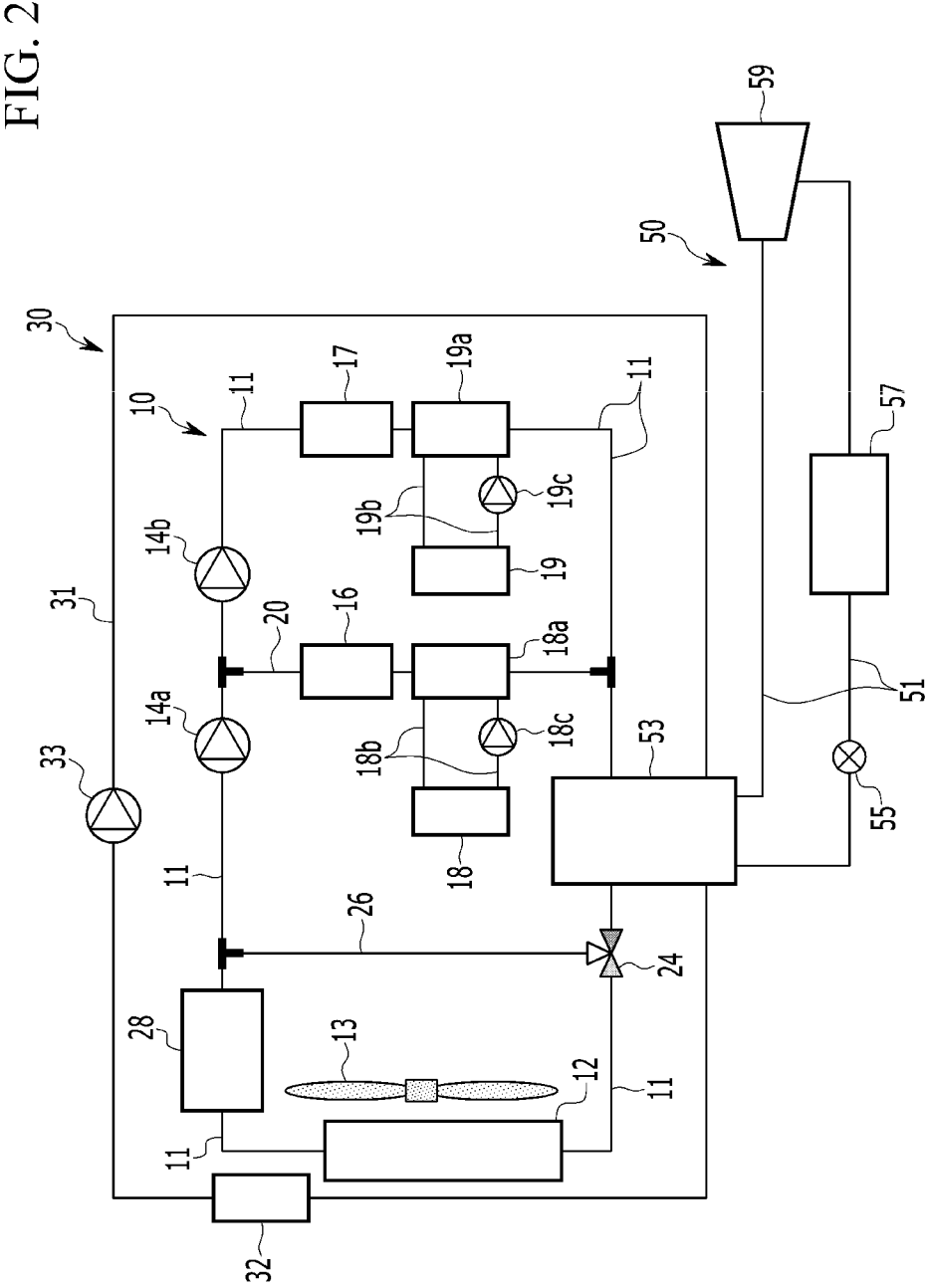
FIG. 2 is a block diagram of a thermal management system for a vehicle according to a second exemplary embodiment of the present disclosure.

FIG. 2 is a block diagram of a thermal management system for a vehicle according to a second exemplary embodiment of the present disclosure.

The thermal management system for a vehicle according to the second exemplary embodiment of the present disclosure may improve cooling performance of electrical components and driving motors by controlling a flow rate of coolant.

Such a thermal management system may be applied to an electric vehicle.

Referring to FIG. 2, the thermal management system may include a cooling device 10 and at least one oil coolers.

First, the cooling device 10 includes a radiator 12, at least one electrical component, at least one water pump, and a reservoir tank 28, which are connected to a coolant line 11.

The radiator 12 is disposed at the front of the vehicle, and has a cooling fan 13 disposed therebehind to cool the coolant through an operation of the cooling fan 13 and heat-exchange with external air.

In the present exemplary embodiment, the electric component includes an inverter and an on board charger (OBC). Meanwhile, the electric component may further include an electric power control unit (EPCU) or an autonomous driving controller.

Such an electric component may be cooled by coolant supplied from the cooling device 10.

Accordingly, when waste heat of the electrical components is recovered in a heating mode of the vehicle, heat generated from the power control device, the inverter, the charger, or the autonomous driving controller may be recovered.

In addition, the reservoir tank 28 is provided on the coolant line 11 between the radiator 12 and the at least one water pump. The coolant cooled by the radiator 12 may be stored in the reservoir tank 28.

In the second exemplary embodiment of the present disclosure, the at least one oil cooler is connected to at least one driving motor to cool the at least one driving motor, and may be selectively cooled by the coolant supplied from the cooling device 10.

In the present exemplary embodiment, among the at least one oil cooler, a second oil cooler is provided on the coolant line.

In addition, the first oil cooler may be disposed in parallel with the second oil cooler provided on the coolant line 11 through a parallel line 20 provided on the coolant line 11.

Here, the at least one driving motor may be configured as first and second driving motors 18 and 19, respectively, to correspond to front and rear wheels.

In addition, the at least one oil cooler includes a first oil cooler 18a provided on the parallel line 20 to correspond to the first driving motor 18, and a second oil cooler 19a provided on the coolant line 11 to correspond to the second driving motor 19.

That is, the first driving motor 18 may be connected to the first oil cooler 18a through a first oil line 18b, and a first oil pump 18c may be provided on the first oil line 18b.

In addition, the second driving motor 19 may be connected to the second oil cooler 19a through a second oil line 19b, and a second oil pump 19c may be provided on the second oil line 19b.

That is, the first and second oil coolers 18a and 19a may use the coolant supplied from the radiator 12 to cool the oil supplied to the first and second driving motors 18 and 19, respectively.

When cooling of the first and second driving motors 18 and 19 is required, the first and second oil pumps 18c and 19c may be selectively operated to supply cooled oil to the first and second driving motors 18 and 19.

In addition, the first and second oil pumps 18c and 19c may be operated even when the waste heat source generated by the first and second driving motors 18 and 19 is recovered in the heating mode of the vehicle.

That is, the temperature of the oil cooled by the first and second oil pumps 18c and 19c rises while the oil cooled by the first and second oil pumps 18c and 19c cools the first and second driving motors 18 and 19 through the first and second oil lines 18b and 19b.

The oil of which temperature rises may raise the temperature of the coolant while being cooled through heat-exchange with the coolant in the first and second oil coolers 18a and 19a.

The waste heat generated from the first and second driving motors 18 and 19 may be recovered through the above-described operation.

Meanwhile, the at least one electrical component includes first and second electrical components 16 and 17 respectively disposed on the coolant line 11 and the parallel line 20 to correspond to the first and second oil coolers 18a and 19a.

Here, the first electric component 16 may be provided on the parallel line 20, and the second electric component 17 may be provided on the coolant line 11.

In addition, the at least one water pump may include first and second water pumps 14a and 14b.

First, the first water pump 14a is provided on the coolant line 11 connecting the radiator 12 and the parallel line 20.

In addition, the second water pump 14b is provided on the coolant line 11 connecting the first water pump 14a and the second oil cooler 19a at a position spaced apart from the parallel line 20 based on a flow direction of the coolant.

Here, a first end of the parallel line 20 is connected to the coolant line 11 at a position spaced apart from a rear end of the first water pump 14a.

In addition, a second end of the parallel line 20 may be connected to the coolant line 11 at a front end of the radiator 12 based on the flow direction of the coolant.

Meanwhile, in the present exemplary embodiment, a pumping head of the first water pump 14a may have a larger than the pumping head of the second water pump 14b.

The pumping head refers to a height at which the pump may pump liquid when pumping the liquid.

That is, when the first water pump 14a has a larger pumping head than that of the second water pump 14b, a flow rate of the coolant supplied to the first oil cooler 18a through the parallel line 20 and a flow rate of the coolant supplied to the second oil cooler 19a through the coolant line 11 may be similar.

Therefore, the thermal management system may minimize water flow resistance generated in the parallel line 20 and the coolant line 11, respectively, and may efficiently distribute the flow rate of the coolant flowing into the coolant line 11 and the parallel line 20.

In addition, the thermal management system may secure the maximum flow rate of the coolant that passes through the first and second electrical components 16 and 17 and the first and second oil coolers 18a and 19a along the coolant line 11 and the parallel line 20, and is supplied to the radiator 12.

Accordingly, the cooling performance of the first and second electrical components 16 and 17 and the first and second oil coolers 18a and 19a may be improved.

Conversely, when the first water pump 14a has a smaller pumping head than that of the second water pump 14b, a flow rate of the coolant supplied to the first oil cooler 18a through the parallel line 20 is smaller than a flow rate of the coolant supplied to the second oil cooler 19a through the coolant line 11.

Then, the cooling performance of the first oil cooler 18a may be reduced, and the cooling performance of the first driving motor 18 may be reduced together. Accordingly, damage or failure of the first driving motor 18 may occur, and durability of the first driving motor 18 may be reduced.

Meanwhile, in the present exemplary embodiment, when the first water pump 14a and the second water pump 14b are the pumps having the same pumping head, the first water pump 14a and the second water pump 14b may operate at different revolutions per minute (RPM) so that the flow rates of the coolant supplied to the first and second oil coolers 18a and 19a through the parallel line 20 and the coolant line 11 are different from each other.

Here, the first water pump 14a may operate at a higher revolution per minute (RPM) than that of the second water pump 14b.

Accordingly, the flow rate of the coolant supplied to the first oil cooler 18a through the parallel line 20 and the flow rate of the coolant supplied to the second oil cooler 19a through the coolant line 11 may be similar.

That is, by controlling the RPM of the first and second water pumps 14a and 14b, the thermal management system may minimize water flow resistance generated in the parallel line 20 and the coolant line 11, respectively, and may efficiently distribute the flow rate of the coolant flowing into the coolant line 11 and the parallel line 20.

In addition, the thermal management system may secure the maximum flow rate of the coolant that passes through the first and second electrical components 16 and 17 and the first and second oil coolers 18a and 19a along the coolant line 11 and the parallel line 20, and is supplied to the radiator 12.

Accordingly, the cooling performance of the first and second electrical components 16 and 17 and the first and second oil coolers 18a and 19a may be improved.

Conversely, when the first and second water pumps 14a and 14b having the same pumping head operate at the same RPM, or the second water pump 14b operates at a higher RPM than that of the first water pump 14a, the flow rate of the coolant supplied to the first oil cooler 18a through the parallel line 20 is smaller than the flow rate of the coolant supplied to the second oil cooler 19a through the coolant line 11.

Then, the cooling performance of the first oil cooler 18a may be reduced, and the cooling performance of the first driving motor 18 may be reduced together. Accordingly, damage or failure of the first driving motor 18 may occur, and durability of the first driving motor 18 may be reduced.

On the other hand, in the second exemplary embodiment of the present disclosure, the thermal management system may further include an air conditioning device 50 and a branch line 26.

First, the air conditioning device 50 may include a heat exchanger 53 connected to the coolant line 11 to heat-exchange the coolant introduced therein with a refrigerant, and an expansion valve 55, an evaporator 57, and a compressor 59 connected to the heat exchanger 53 through a refrigerant line 51.

Here, the heat exchanger 53 is connected to the refrigerant line 51 to allow the refrigerant to pass therethrough. The heat exchanger 53 may be provided on the coolant line 11 between the second oil cooler 19a and the radiator 12 so that the coolant circulating in the coolant line 11 passes.

The heat exchanger 53 may condense the refrigerant through heat exchange with the coolant circulating in the coolant line 11. That is, the heat exchanger 53 may be a water-cooled heat exchanger into which the coolant flows.

The expansion valve 55 is provided on the refrigerant line 51 between the heat exchanger 53 and the evaporator 57. The expansion valve 55 may be supplied with the refrigerant that has passed through the heat exchanger 53 and expand the refrigerant.

The evaporator 57 evaporates the refrigerant that is expanded while passing through the expansion valve 55. In addition, the compressor 59 is connected between the evaporator 57 and the heat exchanger 53 through the refrigerant line 51.

The compressor 59 may compress a gaseous refrigerant and supply the compressed refrigerant to the heat exchanger 53.

In addition, a first end of the branch line 26 is connected to the coolant line 11 between the radiator 12 and the parallel line 20.

A second end of the branch line 26 may be connected to the coolant line 11 between the heat exchanger 53 and the radiator 12.

Here, the second end of the branch line 26 may be connected to the coolant line 11 through a branch valve 24 provided on the coolant line 11.

The branch valve 24 may control opening and closing of the branch line 26.

That is, when the waste heat of the first and second electrical components 16 and 17 and the first and second oil coolers 18a and 19a is recovered, the branch line 26 may be selectively opened and closed through the operation of the branch valve 24 so that the coolant is supplied back to the first and second electrical components 16 and 17 and the first and second oil coolers 18a and 19a without passing through the radiator 12.

On the other hand, the thermal management system according to the second exemplary embodiment of the present disclosure may further include a sub cooling device 30.

The sub cooling device 30 includes a sub radiator 32 and a sub water pump 33 connected to a sub coolant line 31.

Here, the sub radiator 32 is disposed on the same line as the radiator 12, and cools the coolant through the operation of the cooling fan 13 and heat exchange with the outside air.

Meanwhile, in the present exemplary embodiment, the sub radiator 32 is described as being disposed on the same line as the radiator 12 as an exemplary embodiment, but is not limited thereto, and the radiator 12 and the sub radiator 32 may also be integrally configured.

In the second exemplary embodiment of the present disclosure, the heat exchanger 53 may be connected to the sub coolant line 31 so that the coolant is supplied from the sub cooling device 30.

The heat exchanger 53 may be respectively connected to the coolant line 11 and the sub coolant line 31 so that the coolant circulating in the cooling device 10 and the sub cooling device 30 passes, respectively.

The heat exchanger 53 may condense the refrigerant through heat exchange with the coolant supplied through the coolant line 11 and the sub coolant line 31 according to the mode of the vehicle.

That is, the thermal management system according to the second exemplary embodiment of the present disclosure has the same configuration as the first exemplary embodiment except for the sub cooling device 30, and the sub cooling device 30 applied to the second exemplary embodiment is applied to improve the performance of the heat exchanger 53 in the air conditioning device 50.

A thermal management system for a vehicle according to a third exemplary embodiment of the present disclosure will be described with reference to FIG. 3.

Figure 3:
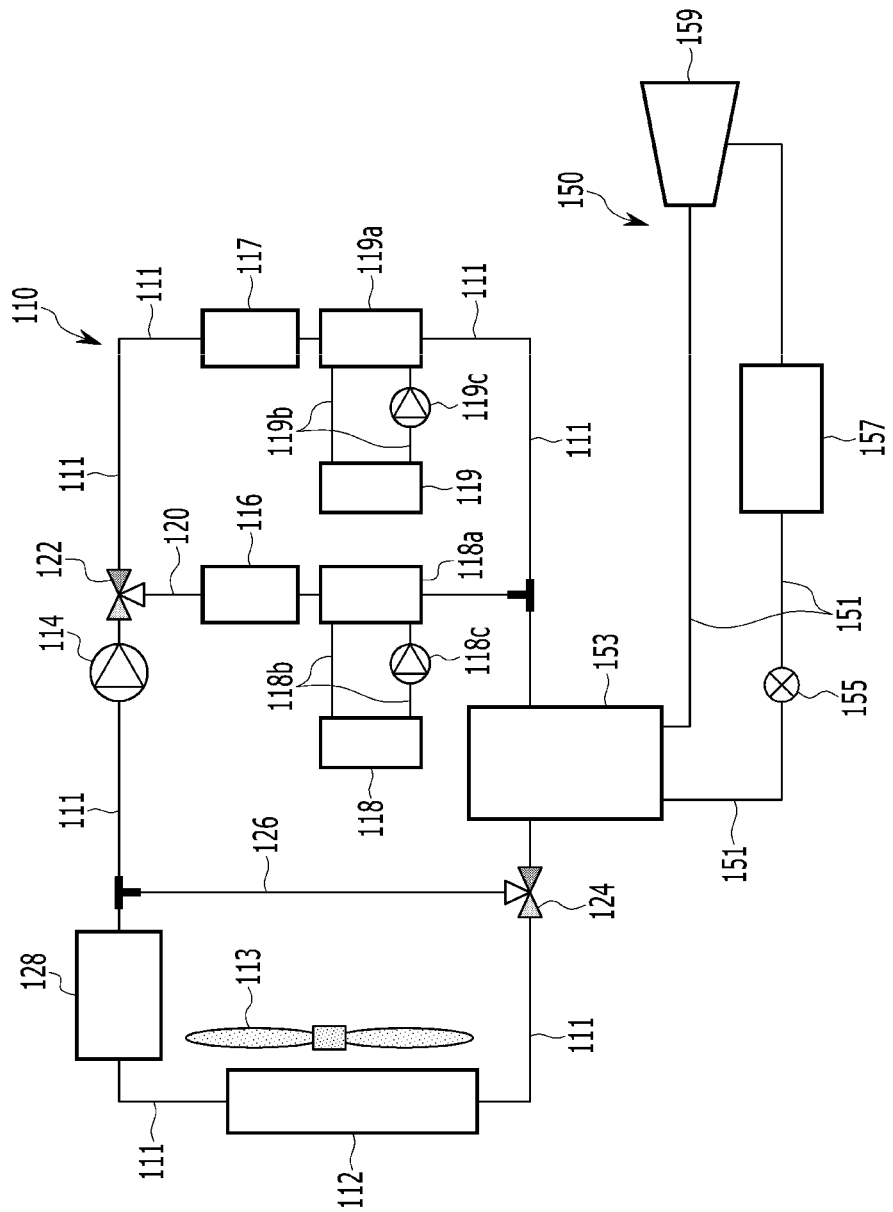
FIG. 3 is a block diagram of a thermal management system for a vehicle according to a third exemplary embodiment of the present disclosure.

FIG. 3 is a block diagram of a thermal management system for a vehicle according to a third exemplary embodiment of the present disclosure.

The thermal management system for a vehicle according to the third exemplary embodiment of the present disclosure may improve cooling performance of electrical components and driving motors by controlling a flow rate of coolant.

Such a thermal management system may be applied to an electric vehicle.

Referring to FIG. 3, the thermal management system may include a cooling device 110 and at least one oil cooler.

First, the cooling device 110 includes a radiator 112, at least one electrical component, one water pump 114, and a reservoir tank 128, which are connected to a coolant line 111.

The radiator 112 is disposed at the front of the vehicle, and has a cooling fan 113 disposed therebehind to cool the coolant through an operation of the cooling fan 113 and heat-exchange with external air.

In the present exemplary embodiment, the electric component includes an inverter and an on board charger (OBC). Meanwhile, the electric component may further include an electric power control unit (EPCU) or an autonomous driving controller.

Such an electric component may be cooled by coolant supplied from the cooling device 110.

Accordingly, when waste heat of the electrical components is recovered in a heating mode of the vehicle, heat generated from the power control device, the inverter, the charger, or the autonomous driving controller may be recovered.

In addition, the reservoir tank 128 is provided on the coolant line 111 between the radiator 112 and the water pump 114. The coolant cooled by the radiator 112 may be stored in the reservoir tank 128.

In the third exemplary embodiment of the present disclosure, the at least one oil cooler is connected to at least one driving motor to cool the at least one driving motor, and may be selectively cooled by the coolant supplied from the cooling device 110.

In the present exemplary embodiment, among the at least one oil cooler, a second oil cooler is provided on the coolant line.

In addition, the first oil cooler may be disposed in parallel with the second oil cooler provided on the coolant line 111 through a parallel line 120 provided on the coolant line 111.

Here, the at least one driving motor may be configured as first and second driving motors 118 and 119, respectively, to correspond to front and rear wheels.

In addition, the at least one oil cooler includes a first oil cooler 118a provided on the parallel line 120 to correspond to the first driving motor 118, and a second oil cooler 119a provided on the coolant line 111 to correspond to the second driving motor 119.

That is, the first driving motor 118 may be connected to the first oil cooler 118a through a first oil line 118b, and a first oil pump 118c may be provided on the first oil line 118b.

In addition, the second driving motor 119 may be connected to the second oil cooler 119a through a second oil line 119b, and a second oil pump 119c may be provided on the second oil line 119b.

That is, the first and second oil coolers 118a and 119a may use the coolant supplied from the radiator 112 to cool the oil supplied to the first and second driving motors 118 and 119, respectively.

When cooling of the first and second driving motors 118 and 119 is required, the first and second oil pumps 118c and 119c may be selectively operated to supply cooled oil to the first and second driving motors 118 and 119.

In addition, the first and second oil pumps 118c and 119c may be operated even when the waste heat source generated by the first and second driving motors 118 and 119 is recovered in the heating mode of the vehicle.

That is, the temperature of the oil cooled by the first and second oil pumps 118c and 119c rises while the oil cooled by the first and second oil pumps 118c and 119c cools the first and second driving motors 118 and 119 through the first and second oil lines 118b and 119b.

The oil of which temperature rises may raise the temperature of the coolant while being cooled through heat-exchange with the coolant in the first and second oil coolers 118a and 119a.

The waste heat generated from the first and second driving motors 118 and 119 may be recovered through the above-described operation.

Meanwhile, the at least one electrical component includes first and second electrical components 116 and 117 respectively disposed on the coolant line 111 and the parallel line 120 to correspond to the first and second oil coolers 118a and 119a.

Here, the first electric component 116 may be provided on the parallel line 120, and the second electric component 117 may be provided on the coolant line 111.

In addition, the water pump 114 is provided on the coolant line 111 connecting the radiator 112 and the parallel line 120 at a front end of the parallel line 120.

Here, a first end of the parallel line 20 is connected to the coolant line 11 through a valve 122 at a position spaced apart from a rear end of the water pump 114.

In addition, a second end of the parallel line 20 may be connected to the coolant line 11 at a front end of the radiator 12 based on the flow direction of the coolant.

Here, the valve 122 may be a 3-way valve capable of distributing a flow rate.

That is, when the water pump 114 is operated, the valve 122 may be controlled so that the flow rate of the coolant supplied to the first oil cooler 18a through the parallel line 20 and the flow rate of the coolant supplied to the second oil cooler 19a through the coolant line 11 are similar.

Therefore, by controlling the valve 122, the thermal management system may minimize water flow resistance generated in the parallel line 120 and the coolant line 111, respectively, and may efficiently distribute the flow rate of the coolant flowing into the coolant line 111 and the parallel line 120.

In addition, the thermal management system may secure the maximum flow rate of the coolant that passes through the first and second electrical components 116 and 117 and the first and second oil coolers 118a and 119a along the coolant line 111 and the parallel line 120, and is supplied to the radiator 112.

Accordingly, the cooling performance of the first and second electrical components 116 and 117 and the first and second oil coolers 118a and 119a may be improved.

On the other hand, in the third exemplary embodiment of the present disclosure, the thermal management system may further include an air conditioning device 150 and a branch line 126.

First, the air conditioning device 150 may include a heat exchanger 153 connected to the coolant line 111 to heat-exchange the coolant introduced therein with a refrigerant, and an expansion valve 155, an evaporator 157, and a compressor 159 connected to the heat exchanger 153 through a refrigerant line 151.

Here, the heat exchanger 153 is connected to the refrigerant line 151 to allow the refrigerant to pass therethrough. The heat exchanger 153 may be provided on the coolant line 111 between the second oil cooler 119a and the radiator 112 so that the coolant circulating in the coolant line 111 passes.

The heat exchanger 153 may condense the refrigerant through heat exchange with the coolant circulating in the coolant line 111. That is, the heat exchanger 153 may be a water-cooled heat exchanger into which the coolant flows.

The expansion valve 155 is provided on the refrigerant line 151 between the heat exchanger 153 and the evaporator 157. The expansion valve 155 may be supplied with the refrigerant that has passed through the heat exchanger 153 and expand the refrigerant.

The evaporator 157 evaporates the refrigerant that is expanded while passing through the expansion valve 155. In addition, the compressor 159 is connected between the evaporator 157 and the heat exchanger 153 through the refrigerant line 151.

The compressor 159 may compress a gaseous refrigerant and supply the compressed refrigerant to the heat exchanger 153.

In addition, a first end of the branch line 126 is connected to the coolant line 111 between the radiator 112 and the parallel line 120.

A second end of the branch line 126 may be connected to the coolant line 111 between the heat exchanger 153 and the radiator 112.

Here, the second end of the branch line 126 may be connected to the coolant line 111 through a branch valve 124 provided on the coolant line 111.

The branch valve 124 may control opening and closing of the branch line 126.

That is, when the waste heat of the first and second electrical components 116 and 117 and the first and second oil coolers 118a and 119a is recovered, the branch line 126 may be selectively opened and closed through the operation of the branch valve 124 so that the coolant is supplied back to the first and second electrical components 116 and 117 and the first and second oil coolers 118a and 119a without passing through the radiator 112.

In addition, a thermal management system for a vehicle according to a fourth exemplary embodiment of the present disclosure will be described with reference to FIG. 4.

Figure 4:
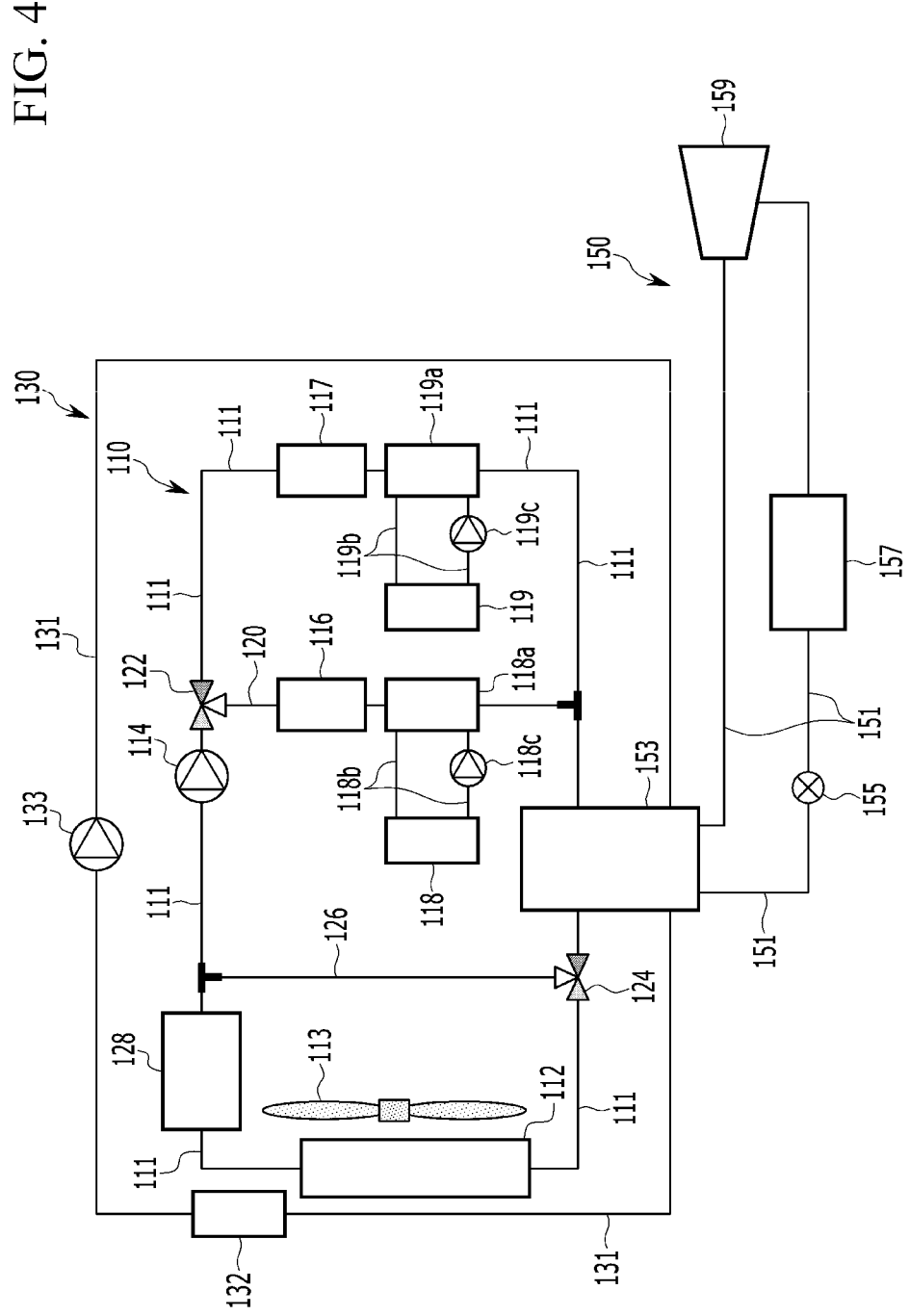
FIG. 4 is a block diagram of a thermal management system for a vehicle according to a fourth exemplary embodiment of the present disclosure.

FIG. 4 is a block diagram of a thermal management system for a vehicle according to a fourth exemplary embodiment of the present disclosure.

The thermal management system for a vehicle according to the fourth exemplary embodiment of the present disclosure may improve cooling performance of electrical components and driving motors by controlling a flow rate of coolant.

Such a thermal management system may be applied to an electric vehicle.

Referring to FIG. 4, the thermal management system may include a cooling device 110 and at least one oil cooler.

First, the cooling device 110 includes a radiator 112, at least one electrical component, one water pump 114, and a reservoir tank 128, which are connected to a coolant line 111.

The radiator 112 is disposed at the front of the vehicle, and has a cooling fan 113 disposed therebehind to cool the coolant through an operation of the cooling fan 113 and heat-exchange with external air.

In the present exemplary embodiment, the electric component includes an inverter and an on board charger (OBC). Meanwhile, the electric component may further include an electric power control unit (EPCU) or an autonomous driving controller.

Such an electric component may be cooled by coolant supplied from the cooling device 110.

Accordingly, when waste heat of the electrical components is recovered in a heating mode of the vehicle, heat generated from the power control device, the inverter, the charger, or the autonomous driving controller may be recovered.

In addition, the reservoir tank 128 is provided on the coolant line 111 between the radiator 112 and the water pump 114. The coolant cooled by the radiator 112 may be stored in the reservoir tank 128.

In the fourth exemplary embodiment of the present disclosure, the at least one oil cooler is connected to at least one driving motor to cool the at least one driving motor, and may be selectively cooled by the coolant supplied from the cooling device 110.

In the present exemplary embodiment, among the at least one oil cooler, a second oil cooler is provided on the coolant line.

In addition, the first oil cooler may be disposed in parallel with the second oil cooler provided on the coolant line 111 through a parallel line 120 provided on the coolant line 111.

Here, the at least one driving motor may be configured as first and second driving motors 118 and 119, respectively, to correspond to front and rear wheels.

In addition, the at least one oil cooler includes a first oil cooler 118a provided on the parallel line 120 to correspond to the first driving motor 118, and a second oil cooler 119a provided on the coolant line 111 to correspond to the second driving motor 119.

That is, the first driving motor 118 may be connected to the first oil cooler 118a through a first oil line 118b, and a first oil pump 118c may be provided on the first oil line 118b.

In addition, the second driving motor 119 may be connected to the second oil cooler 119a through a second oil line 119b, and a second oil pump 119c may be provided on the second oil line 119b.

That is, the first and second oil coolers 118a and 119a may use the coolant supplied from the radiator 112 to cool the oil supplied to the first and second driving motors 118 and 119, respectively.

When cooling of the first and second driving motors 118 and 119 is required, the first and second oil pumps 118c and 119c may be selectively operated to supply cooled oil to the first and second driving motors 118 and 119.

In addition, the first and second oil pumps 118c and 119c may be operated even when the waste heat source generated by the first and second driving motors 118 and 119 is recovered in the heating mode of the vehicle.

That is, the temperature of the oil cooled by the first and second oil pumps 118c and 119c rises while the oil cooled by the first and second oil pumps 118c and 119c cools the first and second driving motors 118 and 119 through the first and second oil lines 118b and 119b.

The oil of which temperature rises may raise the temperature of the coolant while being cooled through heat-exchange with the coolant in the first and second oil coolers 118a and 119a.

The waste heat generated from the first and second driving motors 118 and 119 may be recovered through the above-described operation.

Meanwhile, the at least one electrical component includes first and second electrical components 116 and 117 respectively disposed on the coolant line 111 and the parallel line 120 to correspond to the first and second oil coolers 118a and 119a.

Here, the first electric component 116 may be provided on the parallel line 120, and the second electric component 117 may be provided on the coolant line 111.

In addition, the water pump 114 is provided on the coolant line 111 connecting the radiator 112 and the parallel line 120 at a front end of the parallel line 120.

Here, a first end of the parallel line 20 is connected to the coolant line 11 through a valve 122 at a position spaced apart from a rear end of the water pump 114.

In addition, a second end of the parallel line 20 may be connected to the coolant line 11 at a front end of the radiator 12 based on the flow direction of the coolant.

Here, the valve 122 may be a 3-way valve capable of distributing a flow rate.

That is, when the water pump 114 is operated, the valve 122 may be controlled so that the flow rate of the coolant supplied to the first oil cooler 18a through the parallel line 20 and the flow rate of the coolant supplied to the second oil cooler 19a through the coolant line 11 are similar.

Therefore, by controlling the valve 122, the thermal management system may minimize water flow resistance generated in the parallel line 120 and the coolant line 111, respectively, and may efficiently distribute the flow rate of the coolant flowing into the coolant line 111 and the parallel line 120.

In addition, the thermal management system may secure the maximum flow rate of the coolant that passes through the first and second electrical components 116 and 117 and the first and second oil coolers 118a and 119a along the coolant line 111 and the parallel line 120, and is supplied to the radiator 112.

Accordingly, the cooling performance of the first and second electrical components 116 and 117 and the first and second oil coolers 118a and 119a may be improved.

On the other hand, in the fourth exemplary embodiment of the present disclosure, the thermal management system may further include an air conditioning device 150 and a branch line 126.

First, the air conditioning device 150 may include a heat exchanger 153 connected to the coolant line 111 to heat-exchange the coolant introduced therein with a refrigerant, and an expansion valve 155, an evaporator 157, and a compressor 159 connected to the heat exchanger 153 through a refrigerant line 151.

Here, the heat exchanger 153 is connected to the refrigerant line 151 to allow the refrigerant to pass therethrough. The heat exchanger 153 may be provided on the coolant line 111 between the second oil cooler 119a and the radiator 112 so that the coolant circulating in the coolant line 111 passes.

The heat exchanger 153 may condense the refrigerant through heat exchange with the coolant circulating in the coolant line 111. That is, the heat exchanger 153 may be a water-cooled heat exchanger into which the coolant flows.

The expansion valve 155 is provided on the refrigerant line 151 between the heat exchanger 153 and the evaporator 157. The expansion valve 155 may be supplied with the refrigerant that has passed through the heat exchanger 153 and expand the refrigerant.

The evaporator 157 evaporates the refrigerant that is expanded while passing through the expansion valve 155. In addition, the compressor 159 is connected between the evaporator 157 and the heat exchanger 153 through the refrigerant line 151.

The compressor 159 may compress a gaseous refrigerant and supply the compressed refrigerant to the heat exchanger 153.

In addition, a first end of the branch line 126 is connected to the coolant line 111 between the radiator 112 and the parallel line 120.

A second end of the branch line 126 may be connected to the coolant line 111 between the heat exchanger 153 and the radiator 112.

Here, the second end of the branch line 126 may be connected to the coolant line 111 through a branch valve 124 provided on the coolant line 111.

The branch valve 124 may control opening and closing of the branch line 126.

That is, when the waste heat of the first and second electrical components 116 and 117 and the first and second oil coolers 118a and 119a is recovered, the branch line 126 may be selectively opened and closed through the operation of the branch valve 124 so that the coolant is supplied back to the first and second electrical components 116 and 117 and the first and second oil coolers 118a and 119a without passing through the radiator 112.

On the other hand, the thermal management system according to the fourth exemplary embodiment of the present disclosure may further include a sub cooling device 130.

The sub cooling device 130 includes a sub radiator 132 and a sub water pump 133 connected to a sub coolant line 131.

Here, the sub radiator 132 is disposed on the same line as the radiator 112, and cools the coolant through the operation of the cooling fan 113 and heat exchange with the outside air.

Meanwhile, in the present exemplary embodiment, the sub radiator 132 is described as being disposed on the same line as the radiator 112 as an exemplary embodiment, but is not limited thereto, and the radiator 112 and the sub radiator 132 may also be integrally configured.

In the fourth exemplary embodiment of the present disclosure, the heat exchanger 153 may be connected to the sub coolant line 131 so that the coolant is supplied from the sub cooling device 130.

The heat exchanger 153 may be respectively connected to the coolant line 111 and the sub coolant line 131 so that the coolant circulating in the cooling device 110 and the sub cooling device 130 passes, respectively.

The heat exchanger 153 may condense the refrigerant through heat exchange with the coolant supplied through the coolant line 111 and the sub coolant line 131 according to the mode of the vehicle.

That is, the thermal management system according to the fourth exemplary embodiment of the present disclosure has the same configuration as the third exemplary embodiment except for the sub cooling device 130, and the sub cooling device 130 applied to the fourth exemplary embodiment is applied to improve the performance of the heat exchanger 153 in the air conditioning device 150.

Therefore, when the thermal management system for a vehicle according to the first, second, third, and fourth embodiments of the present disclosure is applied as described above, it is possible to secure the cooling performance of the electrical components and the driving motors that generate a large amount of heating in the electric vehicle, simplify the overall system, and improve durability of the electrical components and the driving motors.

Further, according to the present disclosure, the cooling efficiency of the electrical components and the driving motors may be improved by disposing the oil coolers connected to the driving motors disposed to correspond to the front wheels and the rear wheels in parallel, and efficiently controlling the flow rate of the coolant supplied through control of the water pump or control of the valve.

Further, according to the present disclosure, the overall mileage of the electric vehicle may be increased by minimizing the power consumption through efficient temperature control so that the optimal performance of the electrical components and the driving motors is exhibited.

Further, the entire thermal management system for a vehicle is simplified, thereby making it possible to reduce a cost required for manufacturing the thermal management system for a vehicle and a weight of the thermal management system for a vehicle and improve space utilization.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A thermal management system for a vehicle, the thermal management system comprising:
   a cooling device including a radiator, at least one electrical component, and first and second water pumps that are connected to a coolant line, the cooling device configured to circulate coolant through the coolant line so that the coolant is supplied to the at least one electrical component;
   first and second oil coolers connected to cool at least one driving motor and supplied with the coolant from the cooling device,
   wherein the second oil cooler is provided on the coolant line, and the first oil cooler is disposed in parallel with the second oil cooler provided on the coolant line through a parallel line provided on the coolant line,
   wherein the first water pump is provided on the coolant line connecting the radiator and the parallel line, and
   wherein the second water pump is provided on the coolant line connecting the first water pump and the second oil cooler at a position spaced apart from the parallel line;
   an air conditioning device including a heat exchanger connected to the coolant line to heat-exchange the coolant introduced therein with a refrigerant, and an expansion valve, an evaporator, and a compressor connected to the heat exchanger through a refrigerant line;
   a branch line having a first end connected to the coolant line between the radiator and the parallel line and a second end directly connected to the coolant line at a location between the heat exchanger and the radiator; and
   a sub cooling device including a sub radiator and a sub water pump that are connected to a sub coolant line, the sub cooling device configured to circulate the coolant through the sub coolant line,
   wherein the heat exchanger is connected to the sub coolant line so that the coolant is supplied from the sub cooling device.

2. The thermal management system for a vehicle of claim 1, wherein:
   the at least one driving motor is configured as first and second driving motors, respectively, to correspond to front and rear wheels, the first oil cooler is provided on the parallel line to correspond to the first driving motor; and
   the second oil cooler is provided on the coolant line to correspond to the second driving motor.

3. The thermal management system for a vehicle of claim 1, wherein:
   a first end of the parallel line is connected to the coolant line at a position spaced apart from a rear end of the first water pump, and
   a second end of the parallel line is connected to the coolant line at a front end of the radiator based on a flow direction of the coolant.

4. The thermal management system for a vehicle of claim 1, wherein a pumping head of the first water pump is larger than a pumping head of the second water pump so that a flow rate of the coolant supplied to the parallel line and the coolant line are similar.

5. The thermal management system for a vehicle of claim 1, wherein when the first water pump and the second water pump have pumping heads of a same size, the first water pump and the second water pump operate at different revolutions per minute (RPM) so that flow rates of the coolant supplied to the first and second oil coolers through the parallel line and the coolant line are similar.

6. The thermal management system for a vehicle of claim 5, wherein the first water pump operates at a higher revolution per minute (RPM) than that of the second water pump.

7. The thermal management system for a vehicle of claim 2, wherein the at least one electrical component includes first and second electrical components of an inverter and an on board charger respectively disposed on the coolant line and the parallel line to correspond to the first and second oil coolers.

8. The thermal management system for a vehicle of claim 1, wherein the second end of the branch line is connected to the coolant line through a branch valve provided on the coolant line.

9. The thermal management system for a vehicle of claim 2, wherein:

the first driving motor is connected to the first oil cooler through a first oil line, and a first oil pump is provided on the first oil line, and the second driving motor is connected to the second oil cooler through a second oil line, and a second oil pump is provided on the second oil line.

10. The thermal management system for a vehicle of claim 1, wherein a reservoir tank is provided on the coolant line between the radiator and the first and second water pumps.

11. A thermal management system for a vehicle, comprising:

a cooling device including a radiator, at least one electrical component, and at least one water pump that are connected to a coolant line, the cooling device configured to circulate coolant through the coolant line so that the coolant is supplied to the at least one electrical component; and first and second oil coolers connected to cool at least one driving motor and supplied with the coolant from the cooling device, wherein the second oil cooler is provided on the coolant line, and the first oil cooler is disposed in parallel with second oil cooler provided on the coolant line through a parallel line provided on the coolant line, the at least one water pump is provided on the coolant line connecting the radiator and the parallel line at a front end of the parallel line, a first end of the parallel line is connected to the coolant line through a valve at a position spaced apart from a rear end of the water pump, a second end of the parallel line is connected to the coolant line at a front end of the radiator based on a flow direction of the coolant;

an air conditioning device including a heat exchanger connected to the coolant line to heat-exchange the coolant introduced therein with a refrigerant, and an expansion valve, an evaporator, and a compressor connected to the heat exchanger through a refrigerant line;

a branch line having a first end connected to the coolant line between the radiator and the parallel line and a second end connected to the coolant line through a branch valve provided on the coolant line between the heat exchanger and the radiator; and a sub cooling device including a sub radiator and a sub water pump that are connected to a sub coolant line, the sub cooling device configured to circulate the coolant through the sub coolant line, wherein the heat exchanger is connected to the sub coolant line so that the coolant is supplied from the sub cooling device.

12. The thermal management system for a vehicle of claim 11, wherein the valve is a 3-way valve that distributes a flow rate.

13. The thermal management system for a vehicle of claim 11, wherein:

the at least one driving motor is configured as first and second driving motors, respectively, to correspond to front and rear wheels, and the first oil cooler is provided on the parallel line to correspond to the first driving motor; and the second oil cooler is provided on the coolant line to correspond to the second driving motor.

14. The thermal management system for a vehicle of claim 13, wherein:

the first driving motor is connected to the first oil cooler through a first oil line, and a first oil pump is provided on the first oil line, and the second driving motor is connected to the second oil cooler through a second oil line, and a second oil pump is provided on the second oil line.

15. The thermal management system for a vehicle of claim 14, wherein the at least one electrical component includes first and second electrical components of an inverter and an on board charger respectively disposed on the coolant line and the parallel line to correspond to the first and second oil coolers.

16. The thermal management system for a vehicle of claim 11, wherein a reservoir tank is provided on the coolant line between the radiator and the at least one water pump.

* * * * *